Figure 1:
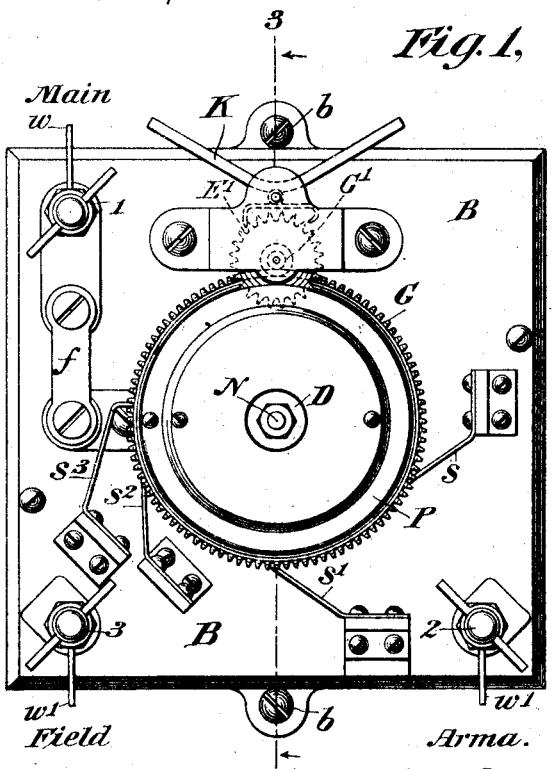

(No Model.) 3 Sheets—Sheet 1.

S. S. WHEELER.
APPARATUS FOR CONTROLLING ELECTRIC MOTORS.

No. 503,690. Patented Aug. 22, 1893.

Witnesses
C. E. Ashley
H. W. Lloyd

Inventor
Schuyler S. Wheeler
By his Attorney
Charles J. Kintner

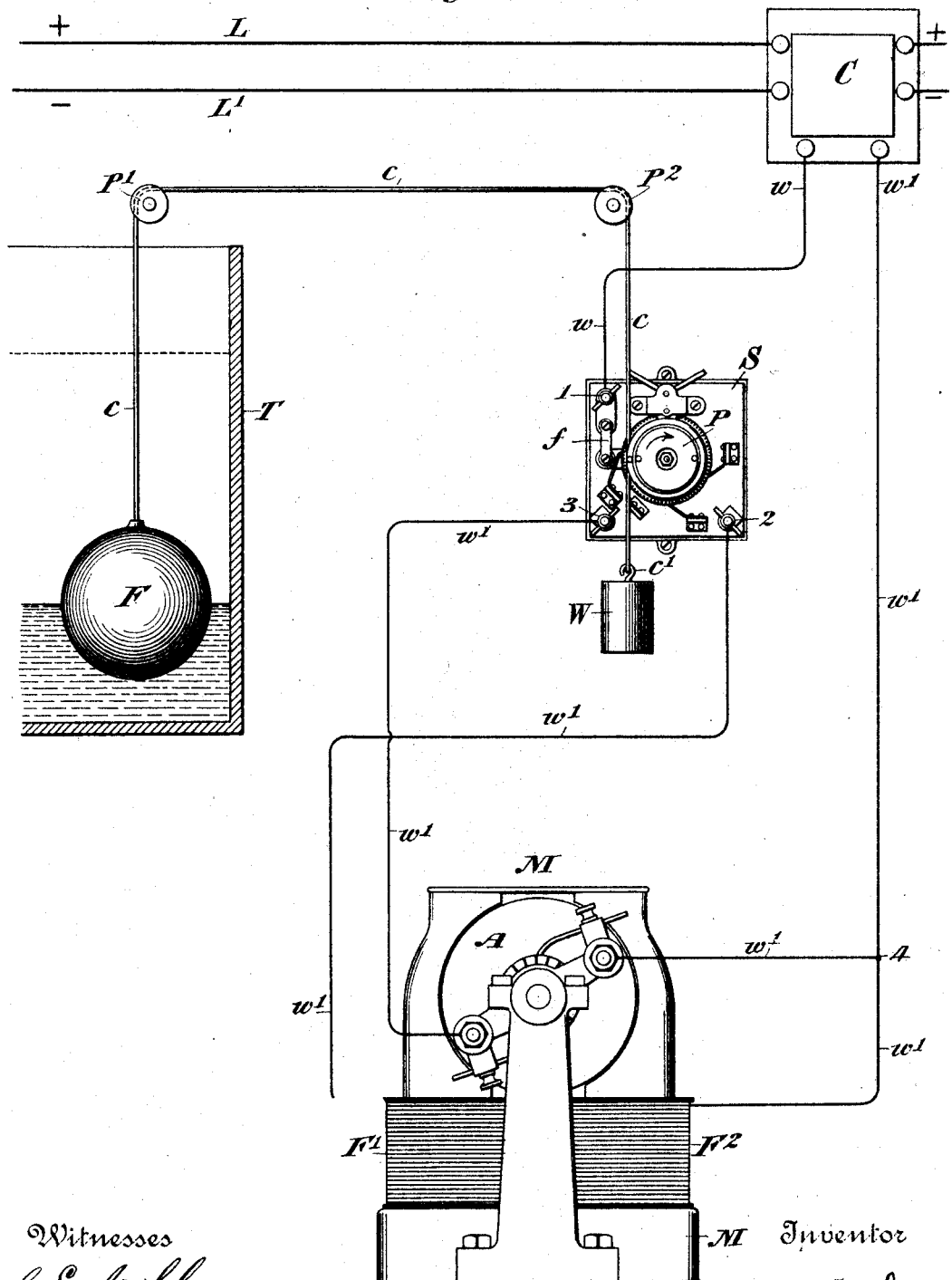

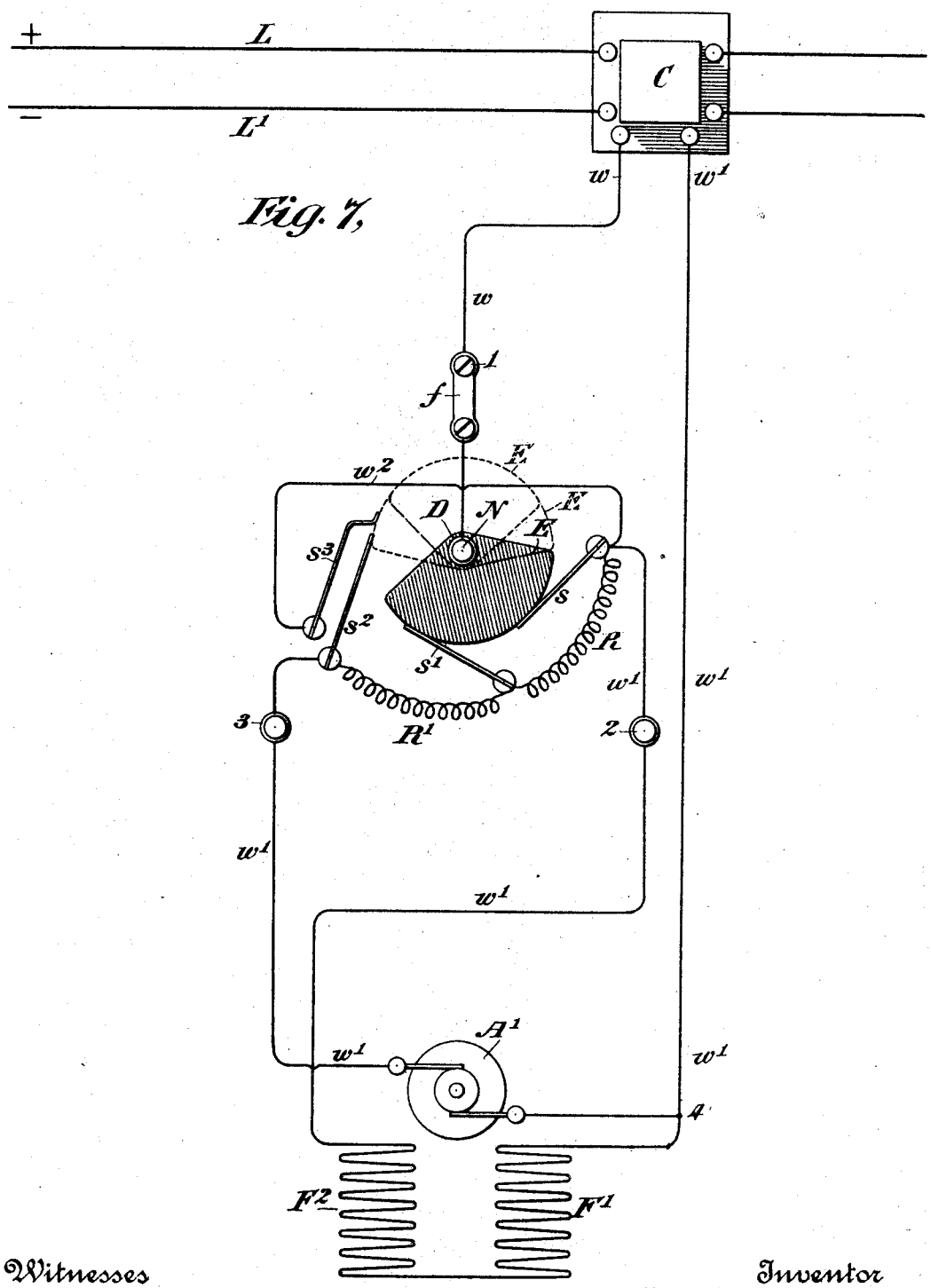

UNITED STATES PATENT OFFICE.

SCHUYLER S. WHEELER, OF NEW YORK, N. Y., ASSIGNOR TO THE CROCKER-WHEELER ELECTRIC COMPANY, OF SAME PLACE.

APPARATUS FOR CONTROLLING ELECTRIC MOTORS.

SPECIFICATION forming part of Letters Patent No. 503,690, dated August 22, 1893.

Application filed June 6, 1892. Serial No. 435,712. (No model.)

*To all whom it may concern:*

Be it known that I, SCHUYLER S. WHEELER, a citizen of the United States, residing at New York, in the county and State of New York, have made a new and useful invention in apparatus for connecting electric motors or other analogous translating devices to and disconnecting them from their sources of electrical energy, and known in the art as switch-boxes, of which the following is a specification.

My invention is directed particularly to a novel form of switch box of that type in which the operating handle is advanced or retracted through its complete phase, and the switching mechanism permitted to follow the handle at a relatively slow rate of speed thereby causing the motor or analogous translating device to be gradually connected in circuit.

The present invention has for its objects: first, the construction of a switch box of the type named in which the switching mechanism shall always move in the same direction both on connecting the motor to, and disconnecting it from its source of current supply; second, the adaptation of such a switch box to use in connection with water tanks in such manner that the apparatus will be automatically actuated when the water reaches a given point near the bottom of the tank to set the motor in operation and cause a pump controlled thereby to fill the tank, the same apparatus being adapted when the tank is full to automatically stop the motor; third, to combine a switch box of the character named with an electric motor provided with means for preventing abnormal sparking on disconnecting the motor from the circuit.

The objects named are fully accomplished by the novel switch box and arrangement of circuits, and mechanical and electrical connections hereinafter described. The especial features of novelty claimed by me as of my invention are particularly pointed out in the claims at the end of this specification.

Prior to my invention switch boxes had been devised in which the operating handle was caused to pass through its complete operating phase and the switching mechanism allowed to gradually connect the motor in circuit, said mechanism being controlled by driving gear and escapement devices and adapted to follow the operating handle slowly forward on cutting the motor into circuit, and to be quickly returned when the operating handle was moved in a reverse direction on disconnecting the motor from the circuit.

It was old to cause the operative parts of an electric motor to be brought gradually into circuit with a source of electrical energy through the agency of a switch, the rotary part of which was advanced always in the same direction by positively impelled retarded mechanism held in check by an electromagnetic detent which was released on rupturing the circuit to the motor. The mechanical portion of my invention differs essentially from such devices in that the retarded power impelled switching apparatus always moves in the same direction, and the rotary electrode or switching arm is held in check in either of two positions by a mechanical stop device controlled in its action by the operation of the power impelled mechanism.

In order that my invention may be fully understood, reference is had to the accompanying drawings in all of which like letters and figures of reference represent like parts wherever used throughout the specification.

Figure 3:
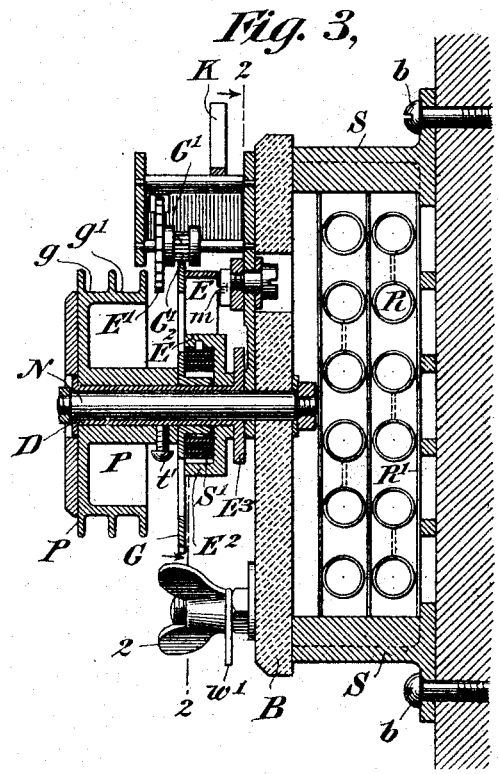
Figure 2:
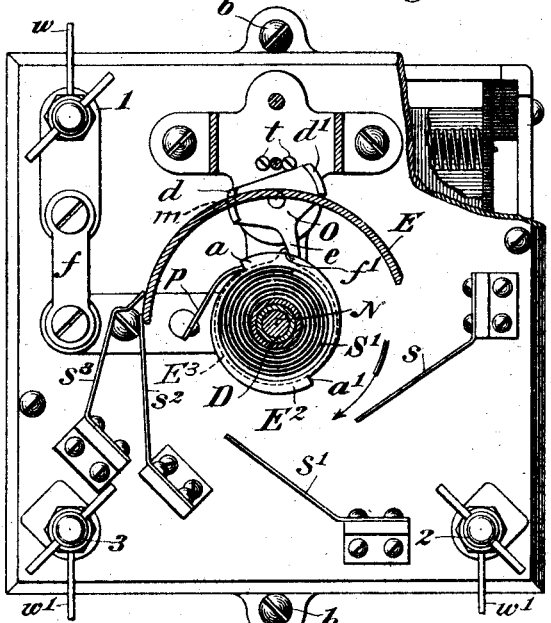
Figures 4, 5:
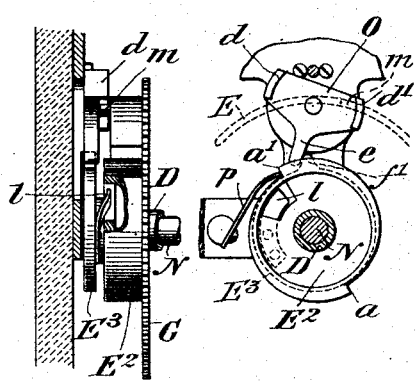

Figure 1 is a plan view of my improved switch box as seen looking down upon the top of it. Fig. 2 is a sectional view taken on the broken line 2—2 Fig. 3 as seen looking from left to right in the direction of the arrows, one of the corners being broken away to show the resistance coils in the base of the box. Fig. 3 is a vertical sectional view taken through the body of the box on line 3—3 Fig. 1 and as seen looking from right to left in the direction of the arrows. Fig. 4 is a detail side elevational view of a portion of the interior mechanism, and Fig. 5 is a part sectional and part elevational view of the parts shown in Fig. 4. Fig. 6 is a diagrammatic view showing the motor, the switch box, circuit connections, and water tank and float and counterweight operatively attached to the switch box in such manner that the height of the water in the tank will regulate the operation of the motor and pump, the latter not being shown. Fig. 7 is a diagrammatic view of the several electrical circuits illustrating their operative relation with the motor to be controlled.

Referring now to the details of the drawings: S is the base of the switch box made preferably of iron and secured to the wall or other point of support by screws b b. B is the top of the box made of insulating material and attached to the base S.

N is a fixed shaft secured in a vertical position in the top B of the box and carrying near its outer end a pulley P attached to a sleeve D by a set screw $t'$.

S' is a main spring coiled in a hollow hub $E^2$ journaled on the inner end of the sleeve D, one end of this spring being secured to this hub and the other to the large driving gear wheel G having a dependent flange E on its under side, m being a detent or stop on the lower side of this flange.

G' is a pinion with which the gear wheel G meshes and is carried by a shaft which also supports an escapement wheel E', and K is a controlling pallet therefor.

O is a pivoted stop device provided with upwardly extending lugs or ears $d\ d'$ and an inwardly extending arm e, the inner end of which lies in the path of a projection or lug $f'$ carried by a disk $E^3$ integral with sleeve D.

p is a detaining pawl secured to the base of the machine, its free end being adapted to fall into notches $a\ a'$ on the face of the hub $E^2$.

t t are back stops for the stop device O.

l is a winding pawl secured at one end to the upper face of the disk $E^3$ its free end resting in the path of a notch on the under face of the hub $E^2$ as clearly shown in Fig. 5.

$s, s', s^2$, and $s^3$ are contact springs secured to the top B against the free ends of which the lateral face of the conducting electrode or flange E bears as it rotates in the direction of the arrow (see Fig. 2).

L and L' are the mains or leads running to the source of electrical supply not shown.

C is a cut out attached to the mains or leads and to the branch wires $w\ w'$ running to the motor M having an armature A and field magnets F', $F^2$ (see Fig. 6).

T is a water tank and F a float resting upon the water in said tank and attached to a rope or cord c passing over pulleys P' $P^2$ and sesured in one of the grooves $g\ g'$ on the face of the pulley P an additional cord $c'$ being secured to said pulley in the remaining groove and supporting a counterpoise or weight w.

1, 2 and 3, are the binding posts of the switch box.

R and R' are resistance coils having their opposite ends connected to the fixed ends of the contact springs $s, s'$ and $s^2$ (see Fig. 7).

$w^2$ is a shunt connected to the fixed ends of the springs s and $s^3$.

f is a fusible cut out.

The operation of the apparatus is as follows: Suppose the apparatus to be in the position shown in Fig. 6. Under this condition of affairs the water in the tank T has permitted the float F to drop to its lowest point and in doing this has caused the cord c passing over the pulleys P' and $P^2$ to transmit motion to the pulley P in the direction of the arrow, at the same time winding the cord $c'$ in the groove $g'$ and raising the counterpoise or weight W to the point shown. As the pulley P was rotated by the descent of the float F, the spring S was put under tension by the action of the push pawl l carried by the disk $E^3$. This caused the drum or hub $E^2$ to rotate, thereby winding up the spring S', the gear wheel G being held stationary by the stop or detent m on the under side of flange E which rested against the lug or ear $d'$ of the pivoted stop device O. As the hub $E^2$ was rotated therefore the detaining pawl p fell successively into the notches a and $a'$ and the lug or projection $f'$ was carried to the opposite side of the arm e of the stop device O. A slightly further advancement of the lug $f'$ therefore would cause said lug to tilt the stop device O into the position shown in Fig. 2, the stop pawl p having first locked the hub $E^2$ into the position shown in Fig. 5. As soon therefore as the stop device O is drawn into the position shown in Fig. 2 the movable electrode or flange E is released and allowed to rotate slowly by reason of the escapement retarding mechanism from the position shown in Fig. 5 to that shown in Fig. 2 (and in dotted lines in Fig. 7) passing successively over the free ends of the contact springs $s, s', s^2$ and $s^3$ thereby first fully magnetizing the field magnets F' $F^2$; imparting slight magnetism to the armature A'; increasing this magnetism in the armature as it passes upon the spring $s'$ and finally fully magnetizing both the armature and the field coils when it reaches the position shown in dotted lines in Fig. 7. The pump is therefore set in operation and the tank is filled. As the float F rises the counterpoise or weight W being sufficient to turn the loose pulley P in a reverse direction causes the disk $E^3$ and lug $f'$ to pass to the position shown in Fig. 5 so that when the float reaches the upper limit point the pivoted detaining device O is again operated and the movable electrode or flange E allowed to advance to the position shown in Fig. 5 thereby rupturing the circuit between the springs $s^2$ and $s^3$ and said movable electrode thus checking the motor. It therefore remains inactive until the float F again assumes its lowest position. It will be noticed that when the flange leaves the spring $s^2$, the armature A', field magnet coils F' and $F^2$, resistance coils R and R' are located in a closed series circuit, and as the result of this arrangement therefore the counter electromotive force of the armature A' running at full speed at the instant of rupture meets and overcomes the extra current or inductive discharge from the field coils F' $F^2$ and resistance coils R R' and consequently the spark is overcome.

The arrangement of circuits disclosed in Fig. 7 of the drawings and this novel method of preventing abnormal sparking at the point of rupture on disconnecting an electric motor or other translating device from its source of current supply is the invention so far as I am aware, of Gano S. Dunn, of New York city, New York, and is made the subject matter of an application for a patent filed by him in the United States Patent Office on the 6th day of June, 1892, bearing Serial No. 435,725 and I make no claim to these features *per se* and my claims in so far as they relate to this portion of the apparatus are only directed to combinations of my improved switching apparatus with this novel arrangement for preventing sparking. I do not limit myself to the specific details of construction herein shown and described for effecting the objects enumerated at the beginning of this specification. I believe I am the first to devise a retarded switch mechanism for connecting electric motors or electric translating devices to and disconnecting them from their sources of current supply in which the switch device moves always in the same direction, and in which the movement of the switching apparatus is controlled by a mechanical stop device actuated by the mechanism itself and my claims are to be construed as of the most generic scope in this particular. It is also apparent that the pulley P may be used as a direct acting switch handle for hand operation and my claims are to be construed as covering such a structure. Other means of controlling the operation of the switch than by the float F and weight W might be utilized and still come within the scope of my claims. Various forms of retarding devices might also be substituted for the retarding mechanism herein before described and shown.

It will of course be understood that when it is desired to use my improved switching apparatus in connection with electric motors generally and without the float and weight, the pulley P will be used by the attendant as an operating handle or lever and rotated in either direction by simply turning it to the right or to the left at will.

Having thus described my invention, what I claim, and desire to secure by Letters Patent of the United States, is—

1. A switch having an operating handle connected to a source of power which carries the movable electrode always in the same direction in combination with retarding mechanism and a mechanically actuated stop device which is set and released by the movement of the operating handle in opposite directions, substantially as described.

2. A switch having a handle operatively connected to a retarded source of power which carries the movable electrode always in the same direction in combination with a mechanically actuated detent or stop device and means operatively connected with the operating handle for placing said detent or stop device in different positions whereby it is adapted to check or hold the electrode in either a closed or an open position substantially as described.

3. A switch having a movable electrode carried by a spring impelled motor held in check by retarding mechanism; an operating handle adapted to wind the spring; a detent adapted to hold the electrode in either of two positions, mechanism controlled by the movement of the operating handle for regulating the position of the detent in either direction the electrode having motion always in one direction and the operating handle in either of two directions substantially as described.

4. In a switch one or more resistances for varying the current supply; a movable electrode adapted to cut out the resistances in sequence and carried by a spring impelled motor provided with retarding mechanism said electrode having motion always in the same direction; an operating handle connected to the impelling motor and adapted to move in either of two directions in combination with detent mechanism adapted to hold the electrode in either a closed or an open position and mechanism operatively connected with the operating handle for moving the detent in opposite directions substantially as described.

5. A switch box having a variable resistance inclosed in its base in combination with two or more contact springs attached thereto and lying in the path of a movable electrode controlled in its movement by a spring actuated motor having retarding mechanism and an operating handle connected thereto through ratchet and detent mechanism the movable electrode having motion always in the same direction and the detent mechanism being set and released by the motion of the operating handle in opposite directions substantially as described.

6. A movable electrode operatively connected with a source of power having retarding mechanism, an operating handle connected thereto through a ratchet and pawl mechanism, in combination with a detent or stop and means carried by the operating handle for placing the detent in either of two positions in accordance with the direction of rotation and position of the operating handle.

7. A switch provided with a movable electrode, a spring, a winding shaft and a hub, the latter having detent mechanism for holding the spring in check at the end of one complete revolution and means consisting of a mechanically actuated stop device for allowing it to advance a fractional part of a revolution to open the switch substantially as described and shown.

8. A switch having a movable electrode carried by a shaft operatively connected to a propelling spring; a hub connected to the shaft and provided with detent and mechanically actuated stop mechanism whereby the switch operates always in one direction substantially as described.

9. An electric motor having its field magnet coils connected in multiple arc relation with a controlling switch having a moving electrode operatively connected to a source of power provided with retarding mechanism and a mechanically actuated detent or stop device in combination with an operating handle which revives the source of power and has motion in opposite directions while the movable electrode moves always in the same direction.

10. A switch having a movable electrode operatively connected to positively impelled mechanism adapted to cause it to move always in the same direction, in combination with a detent or stop device which checks the electrode and the impelling mechanism twice in each revolution and means having motion in either of two directions for setting the detent or releasing it substantially as described.

11. A switch having a movable electrode or arm operatively connected to positively impelled retarding mechanism adapted to move it always in the same direction, in combination with a detent or stop device having mechanical connections for positively moving it in opposite directions whereby it checks the electrode when the conducting portions of the switch are operatively connected with the translating device, then releases it and again checks it after a fractional part of a revolution substantially as described.

SCHUYLER S. WHEELER.

Witnesses:
 GANO S. DUNN,
 BELLE J. HAMILTON.